United States Patent
de la Iglesia

(10) Patent No.: US 8,417,895 B1
(45) Date of Patent: Apr. 9, 2013

(54) SYSTEM FOR MAINTAINING COHERENCY DURING OFFLINE CHANGES TO STORAGE MEDIA

(75) Inventor: Erik de la Iglesia, Sunnyvale, CA (US)

(73) Assignee: Violin Memory Inc., Mountain View, CA (US)

( * ) Notice: Subject to any disclaimer, the term of this patent is extended or adjusted under 35 U.S.C. 154(b) by 310 days.

(21) Appl. No.: 12/794,057

(22) Filed: Jun. 4, 2010

Related U.S. Application Data

(63) Continuation-in-part of application No. 12/619,609, filed on Nov. 16, 2009, which is a continuation-in-part of application No. 12/568,612, filed on Sep. 28, 2009, now Pat. No. 8,160, 070.

(60) Provisional application No. 61/115,426, filed on Nov. 17, 2008, provisional application No. 61/101,645, filed on Sep. 30, 2008.

(51) Int. Cl.
 *G06F 12/12* (2006.01)
(52) U.S. Cl.
 USPC ............................................. 711/141; 711/159
(58) Field of Classification Search ................. None
 See application file for complete search history.

(56) References Cited

U.S. PATENT DOCUMENTS

| | | | |
|---|---|---|---|
| 5,954,796 A | 9/1999 | McCarthy et al. | |
| 6,041,366 A | 3/2000 | Maddalozzo et al. | |
| 6,401,147 B1 | 6/2002 | Sang et al. | |
| 6,636,982 B1 | 10/2003 | Rowlands | |
| 6,678,795 B1 | 1/2004 | Moreno et al. | |
| 6,721,870 B1 | 4/2004 | Yochai et al. | |
| 6,742,084 B1 | 5/2004 | Defouw et al. | |
| 6,789,171 B2 | 9/2004 | Desai et al. | |
| 6,810,470 B1 | 10/2004 | Wiseman et al. | |
| 7,017,084 B2 | 3/2006 | Ng et al. | |
| 7,089,370 B2 | 8/2006 | Luick | |
| 7,100,359 B2 | 9/2006 | Shibata et al. | |
| 7,110,359 B1 | 9/2006 | Acharya | |
| 7,856,533 B2 | 12/2010 | Hur et al. | |
| 7,870,351 B2 | 1/2011 | Resnick | |
| 7,873,619 B1 | 1/2011 | Faibish et al. | |
| 7,975,108 B1 | 7/2011 | Holscher et al. | |
| 8,010,485 B1 | 8/2011 | Chatterjee et al. | |
| 2002/0035655 A1 | 3/2002 | Finn et al. | |
| 2002/0175998 A1 | 11/2002 | Hoang | |
| 2002/0194434 A1 | 12/2002 | Kurasugi | |
| 2003/0012204 A1 | 1/2003 | Czeiger et al. | |
| 2003/0167327 A1* | 9/2003 | Baldwin et al. ............... | 709/225 |

(Continued)

OTHER PUBLICATIONS

Stolowitz Ford Cowger Listing of Related Cases, Feb. 7, 2012.

(Continued)

*Primary Examiner* — Than Nguyen

(57) ABSTRACT

A proxy device monitors memory access operations between clients and a storage media. The proxy device stores at least some of the data from the storage media in a faster tiering media and provides the data from the faster tiering media to the clients for certain associated memory access operations. The proxy is also configured to monitor Small Computer System Interface (SCSI) communications between the clients and the storage media and invalidate at least some data in the tiering media when particular SCSI messages in the SCSI communications indicate the tiering media contains data that is out of sync with the data in the storage media.

20 Claims, 7 Drawing Sheets

U.S. PATENT DOCUMENTS

| | | |
|---|---|---|
| 2003/0177168 A1* | 9/2003 | Heitman et al. .............. 709/201 |
| 2003/0210248 A1 | 11/2003 | Wyatt |
| 2004/0128363 A1 | 7/2004 | Yamagami et al. |
| 2004/0146046 A1 | 7/2004 | Jo et al. |
| 2004/0186945 A1 | 9/2004 | Jeter et al. |
| 2004/0215923 A1 | 10/2004 | Royer |
| 2005/0025075 A1 | 2/2005 | Dutt et al. |
| 2005/0195736 A1 | 9/2005 | Matsuda |
| 2006/0005074 A1 | 1/2006 | Yanai et al. |
| 2006/0034302 A1 | 2/2006 | Peterson |
| 2006/0053263 A1 | 3/2006 | Prahlad et al. |
| 2006/0075191 A1 | 4/2006 | Lolayekar et al. |
| 2006/0112232 A1 | 5/2006 | Zohar et al. |
| 2006/0212524 A1 | 9/2006 | Wu et al. |
| 2006/0218389 A1* | 9/2006 | Li et al. .......................... 713/150 |
| 2006/0277329 A1 | 12/2006 | Paulson et al. |
| 2007/0050548 A1 | 3/2007 | Bali et al. |
| 2007/0079105 A1 | 4/2007 | Thompson |
| 2007/0118710 A1 | 5/2007 | Yamakawa et al. |
| 2007/0124407 A1 | 5/2007 | Weber et al. |
| 2007/0192444 A1 | 8/2007 | Ackaouy et al. |
| 2007/0233700 A1 | 10/2007 | Tomonaga |
| 2007/0283086 A1 | 12/2007 | Bates |
| 2008/0028162 A1 | 1/2008 | Thompson |
| 2008/0098173 A1* | 4/2008 | Chidambaran et al. ....... 711/118 |
| 2008/0104363 A1 | 5/2008 | Raj et al. |
| 2008/0162864 A1* | 7/2008 | Sugumar et al. .............. 711/173 |
| 2008/0215827 A1 | 9/2008 | Pepper |
| 2008/0215834 A1 | 9/2008 | Dumitru et al. |
| 2008/0250195 A1 | 10/2008 | Chow et al. |
| 2008/0320269 A1 | 12/2008 | Houlihan et al. |
| 2009/0006725 A1 | 1/2009 | Ito et al. |
| 2009/0006745 A1 | 1/2009 | Cavallo et al. |
| 2009/0034377 A1 | 2/2009 | English et al. |
| 2009/0110000 A1 | 4/2009 | Brorup |
| 2009/0240873 A1 | 9/2009 | Yu et al. |
| 2009/0259800 A1 | 10/2009 | Kilzer et al. |
| 2009/0262741 A1 | 10/2009 | Jungck et al. |
| 2009/0276588 A1 | 11/2009 | Murase |
| 2009/0307388 A1 | 12/2009 | Tchapda |
| 2010/0011154 A1 | 1/2010 | Yeh |
| 2010/0030809 A1 | 2/2010 | Nath |
| 2010/0080237 A1 | 4/2010 | Dai et al. |
| 2010/0088469 A1 | 4/2010 | Motonaga et al. |
| 2010/0115206 A1 | 5/2010 | de la Iglesia et al. |
| 2010/0115211 A1 | 5/2010 | de la Iglesia et al. |
| 2010/0122020 A1 | 5/2010 | Sikdar et al. |
| 2010/0125857 A1 | 5/2010 | Dommeti et al. |
| 2010/0169544 A1 | 7/2010 | Eom et al. |
| 2010/0174939 A1* | 7/2010 | Vexler .............................. 714/5 |
| 2011/0047347 A1 | 2/2011 | Li et al. |
| 2011/0258362 A1 | 10/2011 | McLaren et al. |
| 2012/0198176 A1 | 8/2012 | Hooker et al. |

OTHER PUBLICATIONS

Rosenblum, Mendel and Ousterhout, John K., The LFS Storage Manager. Proceedings of the 1990 Summer Usenix. 1990 pp. 315-324.

Mark Friedman, Odysseas Pentakalos. Windows 2000 Performance Guide. File Cache Performance and Tuning [reprinted online]. O'Reilly Media. Jan. 2002 [retrieved on Oct. 29, 2012]. Retrieved from the internet: <URL:http://technet.microsoft.com/en-us/library/bb742613.aspx#mainSection>.

* cited by examiner

SYSTEM FOR MAINTAINING COHERENCY DURING OFFLINE CHANGES TO STORAGE MEDIA

This application is a continuation in part of U.S. patent application Ser. No. 12/619,609 filed Nov. 16, 2009 which claims priority to U.S. provisional patent application Ser. No. 61/115,426, filed Nov. 17, 2008, and which are both herein incorporated by reference in their entirety. This application is also a continuation in part of U.S. patent application Ser. No. 12/568,612 filed on Sep. 28, 2009 which claims priority to U.S. Provisional Application Ser. No. 61/101,645 filed Sep. 30, 2008, which are also both incorporated by reference in their entirety.

BACKGROUND

Fibre Channel (FC) provides practical and expandable means of transferring data between workstations, mainframes, supercomputers, desktop computers, and storage devices at fast data rates. Fibre Channel (FC) is especially suited for connecting computer servers to shared storage devices and for interconnecting storage controllers and drives.

A proxy device may be connected by a FC network between a client computer and a storage device. The proxy device may contain a tiering media that needs to maintain an identical state as the storage device, so that consistent and correct data can be provided to the client computer. However, the proxy device may not have access to all operations performed on the storage device. These "offline" operations may leave different versions of data in the tiering media and in the data storage device. When the client computer goes back "on line" and tries to access the storage device through the proxy device, the proxy device may provide incorrect data from the tiering media unless made aware of the offline activity.

DETAILED DESCRIPTION OF THE DRAWINGS

Several preferred examples of the present application will now be described with reference to the accompanying drawings. Various other examples are also possible and practical. This application may be exemplified in many different forms and should not be construed as being limited to the examples set forth herein.

Figure 1:
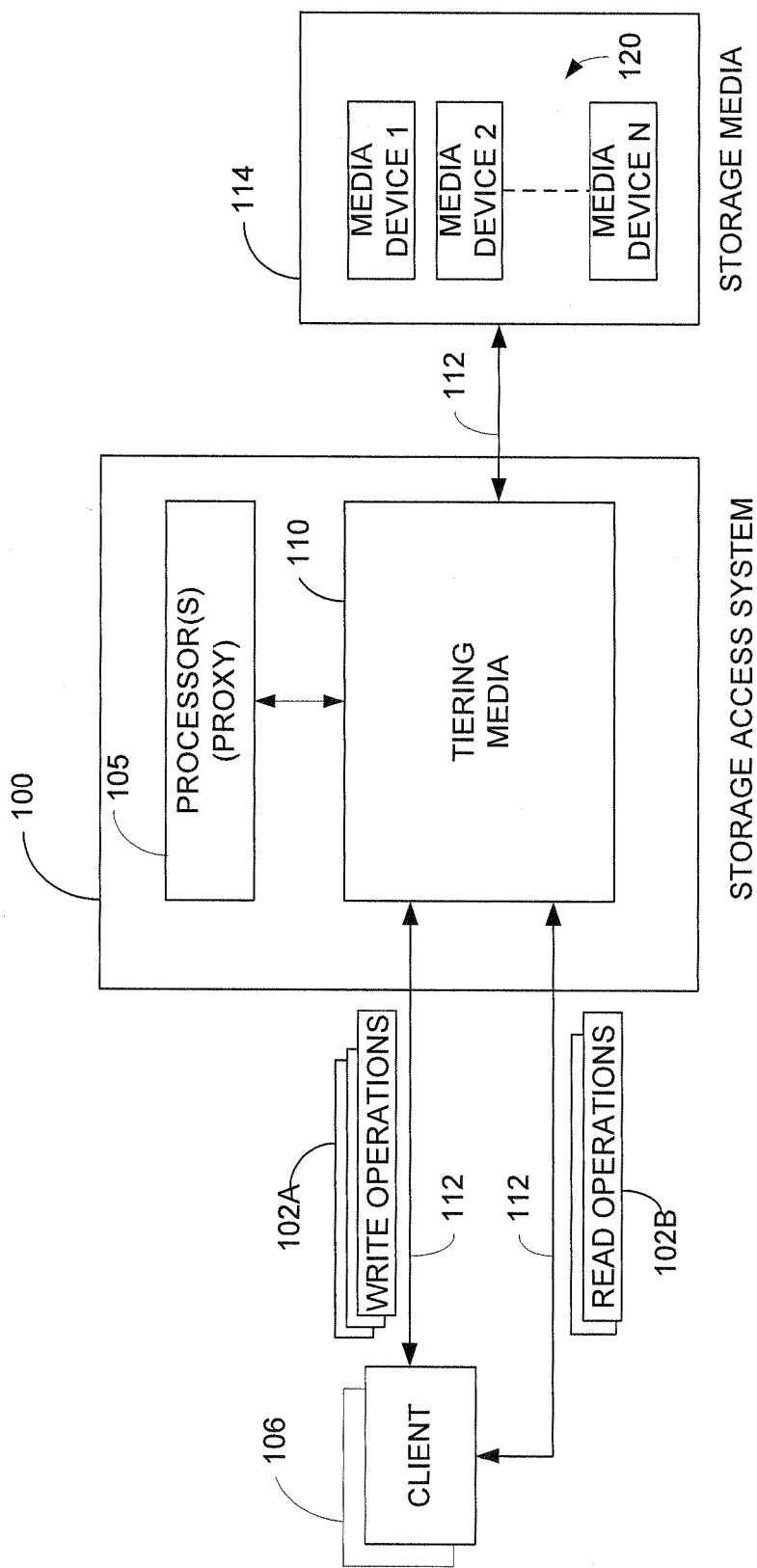
FIG. 1 shows a storage access system coupled between client devices and storage media.

FIG. 1 shows a storage access system 100 connected between client devices 106 and a storage media 114. The client devices 106 can be servers, personal computers, terminals, portable digital devices, routers, switches, or any other wired or wireless computing device that needs to access data on storage media 114. The client devices 106 conduct different storage operations 102 with the storage media 114 though the storage access system 100. The storage operations 102 may include write operations 102A and read operations 102B. The storage media 114 may contain multiple media devices 120, such as multiple storage disks that are referred to generally as a disk array.

In one embodiment, the storage access system 100 and the storage media 114 are stand-alone appliances, devices, or blades. In one embodiment, the client devices 106, storage access system 100, and storage media 114 might be coupled to each other via wired or wireless connections 112 capable of transporting the storage operations 102 and any associated data between client devices 106 and storage media 114.

One example of a connection 112 is a Fibre Channel network that uses the Small Computer System Interface (SCSI) protocol for storage operations. Client devices 106, storage access system 100, and storage media 114 may use fibre channel interface cards or Host Bus Adapters (HBA) (not shown). The fibre channel HBAs allow the client devices 106 and storage media 114 to communicate over the fibre channel medium 112 using the SCSI protocol. Most FC networks utilize SCSI as the underlying storage protocol, and any non-SCSI disk, such as a Serial ATA (SATA) disk, within storage media 114 will typically be virtualized as a SCSI entity.

In another embodiment, the client devices 106 may access one or more of the media devices 120 in storage media 114 over an internal or external data bus. The storage media 114 in this embodiment could be located in personal computers or servers, or could also be a stand-alone device coupled to the client computer/server 106 via a fiber channel SCSI bus, Universal Serial Bus (USB), or packet switched network connections 112.

The storage access system 100 contains one or more processors or processing elements 105 that operate as a proxy for the storage operations 102 between the client devices 106 and storage media 114. Tiering media 110 in storage access system 100 includes different combinations of Flash memory and Dynamic Random Access Memory (DRAM) that typically provides faster access speeds than say disks that may be used in storage media 114.

The storage access system 100 receives the read and write operations 102 from the client devices 106 that are directed to the storage media 114. In one embodiment, the media devices 120 contain multiple storage blocks that have associated block addresses. To improve throughput and/or to reduce latency to the data in the storage media 114, some of the blocks of data from the storage media 114 are temporarily copied into the tiering media 110. The storage access system 100 then uses the data in the faster tiering media 110 to service certain storage access operations 102 from the client devices 106.

In order to maintain data coherency, storage access system 100 monitors all of the storage operations 102 performed in storage media 114 and maintains the same version of data in the tiering media 110 and storage media 114. Proxy 105 is responsible for maintaining this data coherency between the tiering media 110 and the storage media 114 and must see all write operations to storage media 114.

Figure 2:
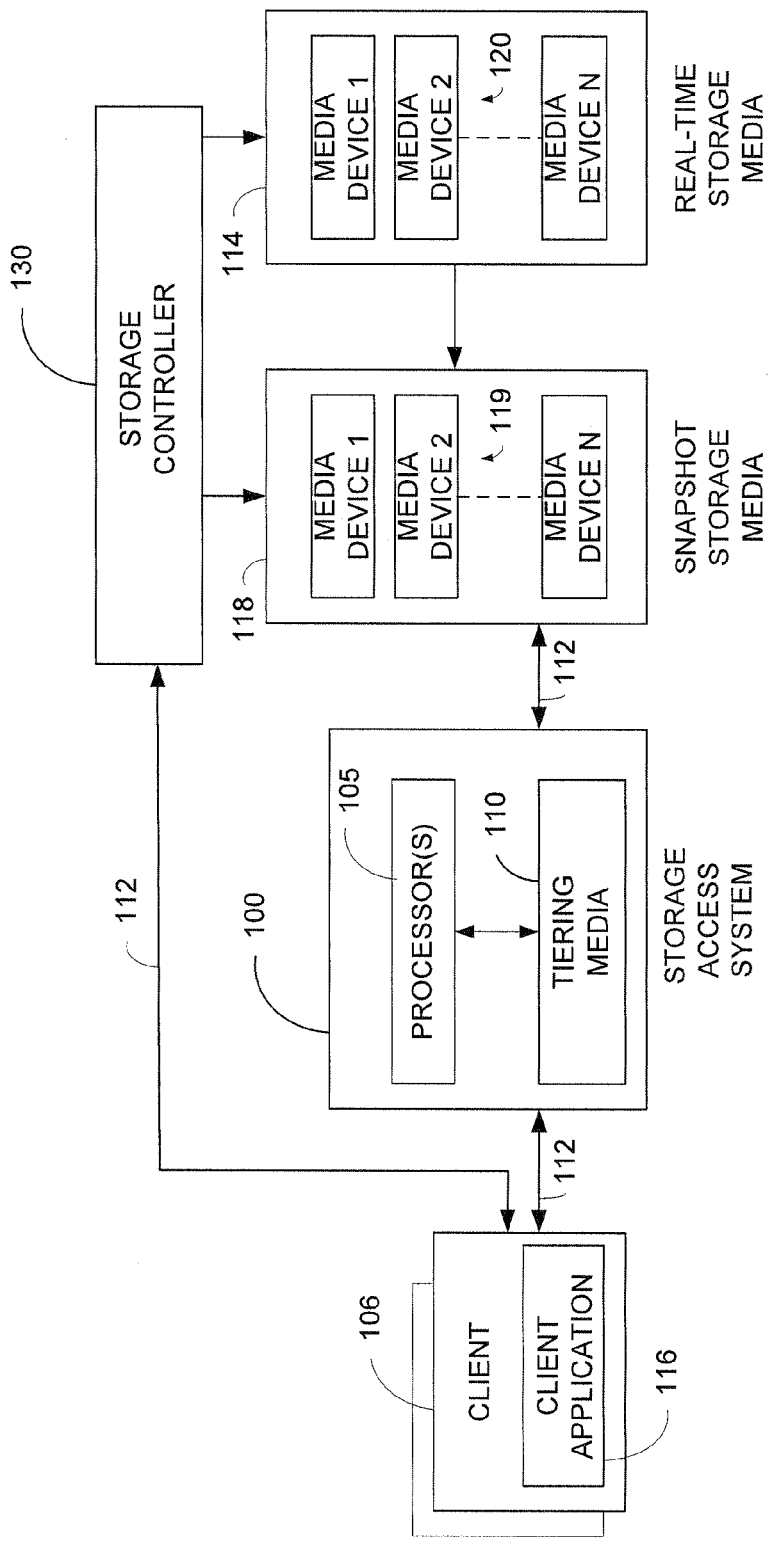
FIGS. 2 and 3 show how data snapshots are performed for data contained in the storage media of FIG. 1.
Figure 3:
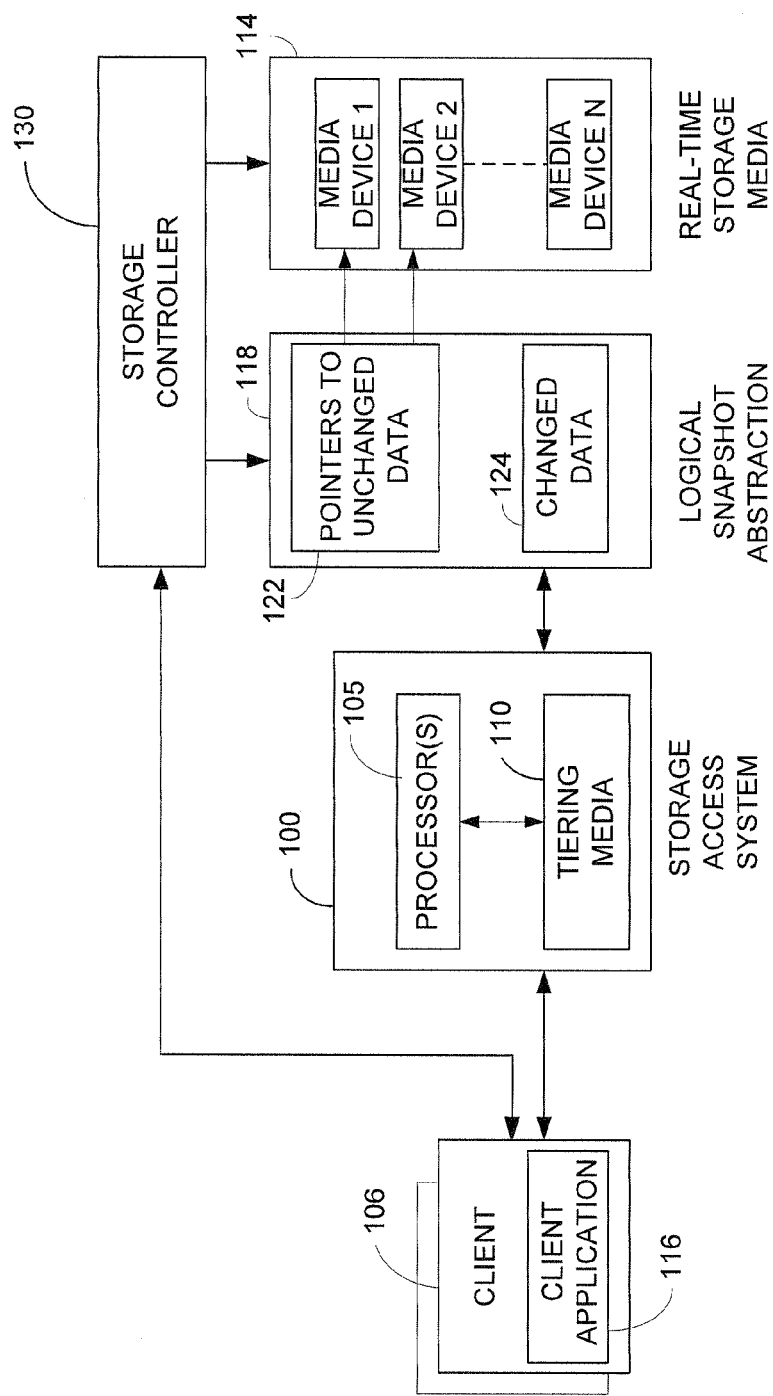

FIGS. 2 and 3 show how snapshot operations might be performed in the storage media 114. A snapshot operation is used for capturing data in storage media 114 at a particular instance in time. A client application 116 operating on client device 106 may need to conduct a backup operation for the data currently stored in storage media 114 or may need to process the data in storage media 114 as of a particular time.

For example, a client database application 116 may need to generate reports for stock market transactions from the previous day. Stock transactions are used as an example below, but of course any type of software application and data may be used.

The client device 106 uses a storage controller 130 to capture a stable state or "snapshot" for the stock transactions from the previous trading day. The storage controller 130 copies a particular set of snapshot data from storage media 114 into other media devices 119 or to a different location in storage media 114. The storage media containing the snapshot data is referred to generally as snapshot storage media 118 and is shown separately from storage media 114 in FIGS. 3 and 4 for illustration purposes. However, the snapshot storage media 118 could be a particular directory or particular media devices 119 within the same storage media 114.

After the snapshot operation, real-time read and write data can continue to be accessed in storage media 114 while the stock transactions from the previous day are isolated as read only data in snapshot storage media 118. The client database application 116 is then free to generate reports for the stock transactions from the previous day from snapshot storage media 118. The advantage of this method is that snapshot storage media 118 will not be constantly updated with new transaction data and thus have superior performance from the perspective of client database application 116. Reports run against storage media 114 would generate the same result, but will include content with real-time updates and thus be slower.

FIG. 3 shows an alternative embodiment where the storage controller 130 generates a logical snapshot using pointers 122 in the snapshot storage media 118. Instead of copying all of the related data from storage media 114 into snapshot storage media 118, the storage controller 130 generates pointers 122 that point to data in the storage media 114 that has not changed since the last snapshot operation. However, any data 124 that has changed since the last snapshot operation is copied from the storage media 114 into the snapshot storage media 118. Again, this could comprise the storage controller 130 copying the stock transactions from the previous day into a particular read only directory in the storage media 114 reserved for the snapshot pointers 122 and changed snapshot data 124. To minimize the time required to perform the snapshot operation, the snapshot method chosen often reflects the percentage of snapshot data that is dynamically changed within the real-time storage. If little change is expected, such as the previous day's stock transaction data that is not expected to be modified during the current day, a pointer system is usually more efficient.

The storage controller 130 needs to ensure that the data in snapshot storage media 118 is accurate with respect to a particular point in time. Data operations should not be in transit when the snapshot operations are performed. For example, the client application 116 should not be performing account balance updates for the stock transactions for the previous day while the storage controller 130 is generating the snapshot data in media 118. Otherwise, the account balance updates may be inconsistent with the stock transactions in snapshot media 18. Specifically, the snapshot operation may be performed within storage controller 130 and not be visible to Storage Access System 100 as no write operations are performed as the snapshot is created.

Figure 4:
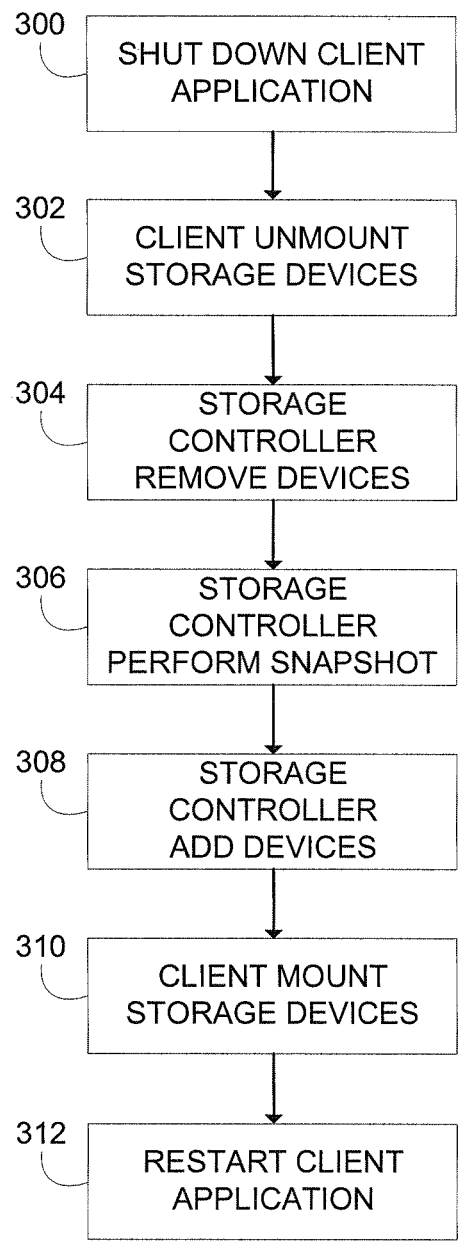
FIG. 4 is a flow diagram showing Small Computer System Interface (SCSI) operations performed for the snapshot operations of FIGS. 2 and 3.

FIG. 4 shows how data is isolated during a snapshot operation. In block 300 the client application 116 is shut down to temporarily stop any read or write operations 120 to storage media 114. The client device 106 in block 302 unmounts the media devices 120 in the storage media 114. For example, the client device 106 may send unmount commands to its operating system. The unmount commands also clear any data that might be cached in the client device 106, such as within the operating system block cache. The storage controller 130 in block 304 then logically removes all media devices 120 from the SCSI network 112 using the method supported by the client device operating system. By clearing its caches, client device 106 assures data integrity when the devices are eventually restored. The client application may have its own caches which are cleared upon shut down.

In block 306 the storage controller 130 is then free to perform the snapshot operations described above in FIGS. 2 and 3 without the client devices 106 or media device 120 changing any data. After the snapshot data is successfully copied into snapshot media 118, the storage controller 130 in block 308 adds the media devices 120 back to the SCSI bus 112 by requesting the client operating system to rescan the SCSI bus and add available devices. In most cases, these new devices will have the same identities as those unmounted in 302. The application thus requires no change or reconfiguration, a key advantage of the snapshot process.

The client device 106 in block 310 remounts the media devices 120 for example by sending mount requests to the client operating system. The client application 116 is then restarted on the client device 106 in block 312. The client application 116 can then go back to performing real-time write and read operations 102 with the storage media 114. The client database application 106 can also start generating the stock transaction reports for the previous day from the data in snapshot storage media 118.

One of the problems with these snapshot operations or any other offline operations, is that data is changed or updated by the storage controller 130 offline from the read and write operations that normally pass through storage access system 100. Because the storage access system 100 cannot monitor these snapshot operations, the proxy device 105 cannot keep the data in tiering media 110 coherent with the data in storage media 114. Other than the rescan operation, client requests to its operating system to mount and unmount devices are not visible on the storage interface.

For example, the tiering media 110 may currently contain some of the snapshot data for stock transactions that happened two days ago. However, after the snapshot operations in FIGS. 2 and 3, the snapshot storage media 118 contains the stock transactions from one day ago, while the tiering media 110 still contains the stock transactions from two days ago. If the data in tiering media 110 is not invalidated or cleared, the storage access system 100 may provide some of the two day old data to the client application 116 instead of the one day old data in snapshot storage media 118. Because the snapshot operations were conducted offline by the storage controller 130, the storage access system 100 has no way of knowing if or when to clear tiering media 110.

Selectively Clearing Tiering Media

Table 1.0 below shows two control operations conducted using the Small Computer System Interface (SCSI) protocol. The proxy 105 uses these control operations to determine when to invalidate or clear data in tiering media 110. A first SCSI bus rescan operation enumerates all devices on the SCSI bus. The rescan operation references each device on the SCSI bus and is used for adding devices to the SCSI bus or to identify a removed device. The rescan operation is typically performed after a snapshot operation when the media devices 120 are remounted in block 310 in FIG. 4.

TABLE 1.0

| CONTROL OPERATIONS TYPE | PURPOSE | NUMBER OF MEDIA DEVICES REFERENCED |
|---|---|---|
| SCSI BUS RESCAN | ENUMERATE ALL DEVICES ON SCSI BUS | ALL DEVICES ON SCSI BUS |
| SCSI DEVICE INQUIRY | OBTAIN DEVICE PARAMETERS FOR SPECIFIC SCSI DEVICE | ONLY SPECIFIED DEVICE |

A second SCSI device inquiry message obtains parameters for specified SCSI target devices that have already been scanned and applies to the SCSI devices specifically referenced in the device inquiry message. For example, the SCSI bus rescan indicates a particular number of media devices 120 in the storage media 114 and the SCSI device inquiry identifies the size and other parameters of the individual media devices 120.

The SCSI bus rescan is typically associated with a complete reconfiguration of a SCSI device. However, SCSI device inquiry can happen at any time and is not necessarily associated the reconfiguration of a SCSI device. For example, an initiator may issue a SCSI device inquiry to check the status of a target device. The exact cases during which rescan and inquiry operations occur depend on the operating system of the client and the exact configuration of the operating system and applications software.

Figure 5:
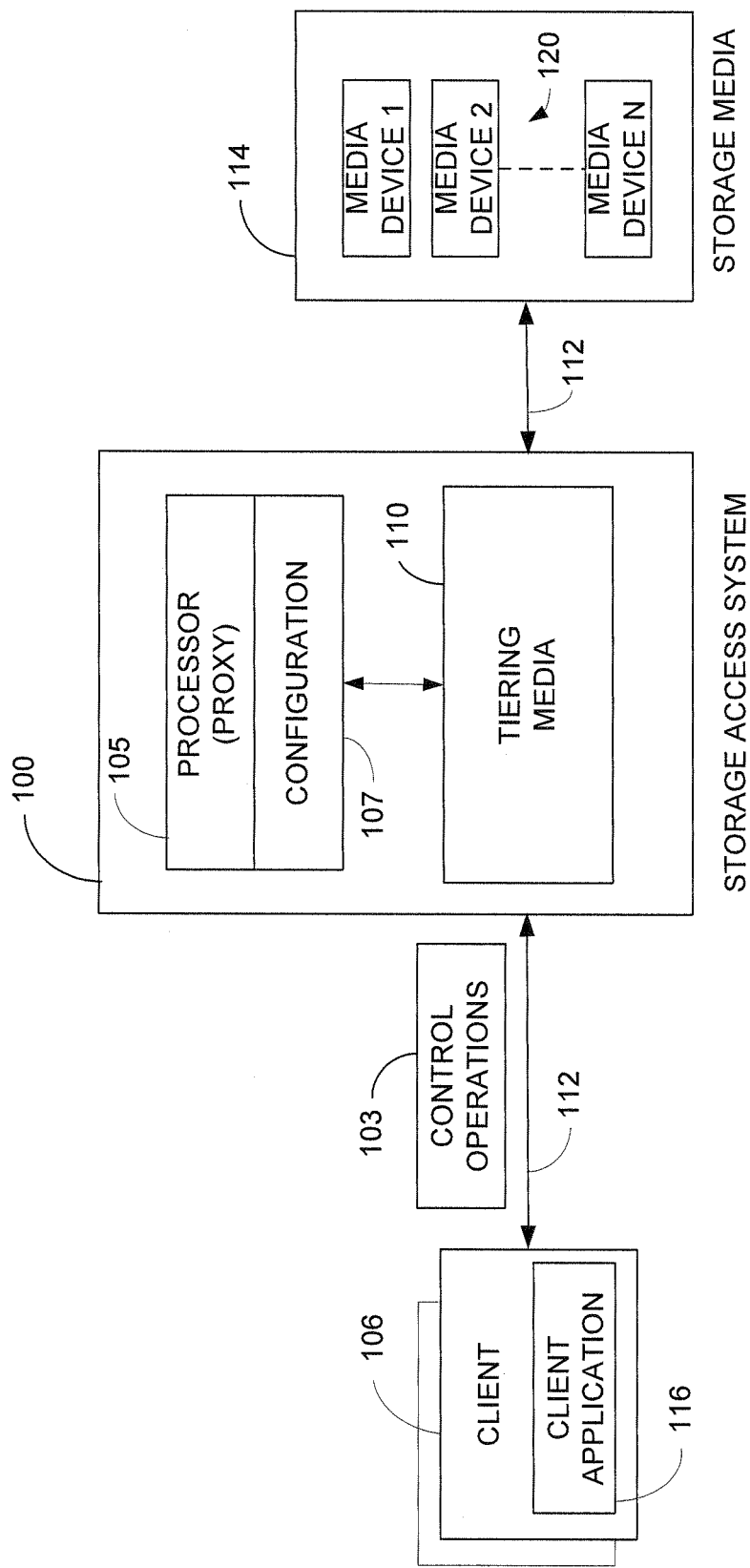
FIG. 5 shows how the storage access system in FIG. 1 uses SCSI operations to identify snapshot operations.

FIG. 5 shows one embodiment of the storage access system 100 that monitors control operations 103 sent between the client devices 106 and storage media 114, in addition to the read and write memory access operations 102 described above in FIG. 1. In one example, the control operations 103 include SCSI commands for the SCSI protocol used over a SCSI fiber channel network 112. However, the control operations 103 could be any operations used in any protocol that can be associated with potentially non-concurrent data in tiering media 110.

The storage access system 100 includes registers, buffers, or memory that stores configuration data 107. The configuration data 107 is used by the proxy 105 to determine when to clear or invalidate data in tiering media 110. The configuration information 107 can be entered by a system administrator based on the type of control operations 103 performed in the system in FIG. 5. The configuration information 107 can also be dynamically changed, for example using a script or Application Programmers Interface (API) according to the particular control operations 103 currently being performed on the SCSI bus 112 and/or based on the frequency of the control operations 103.

Figure 6:
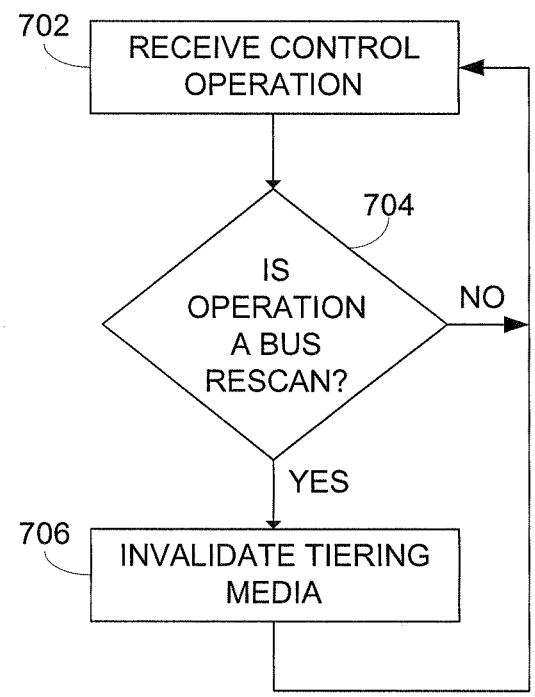
FIG. 6 is a flow diagram showing how the storage access system in FIG. 1 invalidates data in a tiering media responsive to a SCSI bus rescan.

Referring to FIG. 6, in one embodiment, the proxy 105 in block 702 detects control operations 103 sent from the client device 106 to the storage media 114. Again in one example, the control operations 103 are SCSI messages. The proxy 105 in block 704 checks to see if the control operation 103 is a SCSI bus rescan operation. For example, the proxy 105 looks for a designator in SCSI control messages that indicate a bus rescan message. If the message is not a bus rescan, the proxy 105 continues to monitor the control operations in block 702.

If the control operation 103 is a bus rescan in block 704, the proxy 105 in block 706 invalidates all of the data in tiering media 706. The proxy 105 assumes that the bus rescan operation 103 followed some offline operation that possibly changed the data in storage media 114. For example, the bus rescan could have followed the snapshot operation described in FIG. 2. Accordingly, the proxy 105 invalidates all of the data in tiering media 110 to prevent out of date data from being supplied to the client application 116.

In some computer systems, client devices 106 may assume that the media devices 120 maintain the same configuration after a snapshot operation. Accordingly, the client devices 106 may not issue bus rescans after snapshot operations or after other offline operations. If there is no SCSI bus rescan, the proxy 105 will not clear the data in tiering media 110 and could supply out of date data to the client device 106.

The proxy device 105 could be programmed to clear the tiering media 110 after some other SCSI operation affiliated with an offline operation that changes data in storage media 114. For example, the proxy device 105 could be programmed to clear the tiering media 110 responsive to the SCSI device inquiry message described above in Table 1.0. Referring briefly back to FIG. 4, the client device 106 issues the SCSI device inquiry after a snapshot operation and before the media devices 120 are remounted in operation 310.

However, the client devices 106 may frequently issue SCSI device inquires to the media devices 120 to obtain device status information. Frequently clearing the tiering media 110 after each SCSI device query would substantially slow down the storage access system 100. If the data in tiering media 110 is frequently invalidated, the storage access system 100 could not provide as many hits from the faster memory devices contained in tiering media 110. The storage access system 100 could even slow memory access times below the typical speeds provided by storage media 114.

Figure 7:
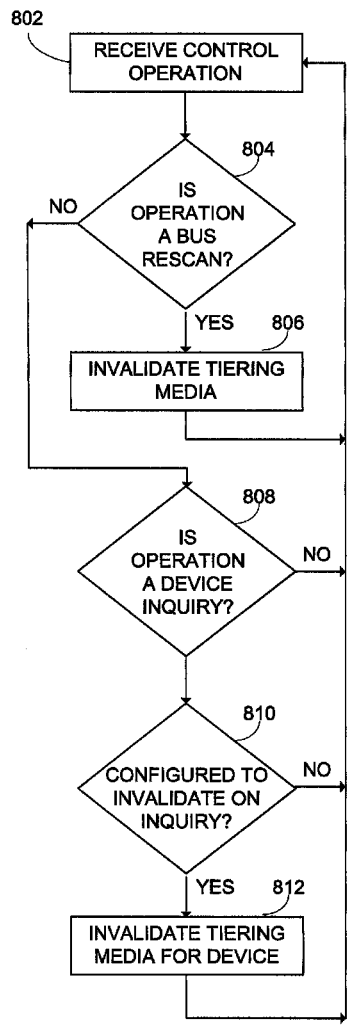
FIG. 7 is a flow diagram showing how the storage access system in FIG. 1 invalidates data in a tiering media responsive to a SCSI bus rescan and a SCSI device inquiry.

FIG. 7 shows how the storage access system 100 ensures correct data is provided to the client devices 106 and also prevents invalidation of the data in tiering media 110 from significantly slowing down memory access times. The proxy 105 in block 802 monitors the SCSI control operations 103 exchanged between the client device 106 and storage media 114. The proxy 105 in block 804 checks to see if the control operation 107 is a SCSI bus rescan. If the control operation 103 is a bus rescan in block 804, the proxy 105 in block 806 invalidates all of the data in tiering media 706. This prevents the storage access system 100 from providing out of date data when the client application 116 makes subsequent memory access requests 102 (FIG. 1) to storage media 114.

If the control operation 103 is not a SCSI bus rescan, proxy 105 in block 808 checks to see if the control operation 103 is a SCSI device inquiry. If the control operation 103 is not a SCSI device inquiry, the proxy 105 goes back to monitoring the control operations 103 in block 802. If the control operation 103 is a SCSI device inquiry, the proxy 105 in block 810 checks the configuration data 107 in block 810. Alternatively, the proxy 105 could have also checked the configuration data 107 earlier during initial device configuration.

As explained above, different computer systems may perform SCSI bus rescans and SCSI device inquires in different situations. For example, some computing systems may not perform snapshot operations. Other computer systems may decide to issue the SCSI device inquires in conjunction with the mounting of media devices after snapshot operations.

An administrator or client device 106 programs the configuration data 107 in a register or memory device. The configuration data 107 either enables or disables the proxy 105 to invalidate data in tiering media 110. The configuration data 107 may remain static during subsequent system operations or the administrator or client device 106 may dynamically set or change the configuration data 107 when a snapshot operation is performed.

The proxy device reads the configuration data 107 in block 810 to determine if SCSI device inquiries are associated with an operation, such as a snapshot operation, that requires invalidation of at least some data in tiering media 110. For example, the configuration data 107 may be a bit or flag that is set to notify the proxy 105 to clear data in the tiering media 110 whenever a SCSI device inquiry is detected. The configuration data 107 can be set via an administration script based on a time of day, initiation of a snapshot operation, or based on any other event that can change coherency between data in storage media 114 and data in tiering media 110.

If the configuration data 107 is not set in block 810, the proxy 105 moves back to block 802 and waits for the next control operation. Otherwise, the proxy 105 in block 812 invalidates the data in tiering media 110 associated with the particular media device 120 identified in the SCSI device inquiry.

For example, data in tiering media 110 is mapped to a particular media device 120 and to a particular address or block address in the media device 120. The proxy 105 searches for any data in tiering media 110 that maps to the media device 120 identified in the SCSI device inquiry. The proxy 105 then invalidates the identified data or blocks of data in operation 812. In another example, the device referenced in the SCSI device inquiry may represent multiple disks or a stripe of data across multiple disks in a device volume. The proxy 105 in operation 812 only invalidates the data in tiering media 110 associated with those particular disks or device volume.

Thus, outdated data is invalidated in the tiering media 110 even when the client device 106 fails to issue SCSI bus rescans after snapshot operations. Invalidation based on SCSI devices inquiries is programmable. Therefore, the proxy 105 will also not unnecessarily invalidate data in the tiering media 110 for SCSI device inquiries not associated with snapshot operations or for other operations that do not require invalidation of the data in tiering media 110.

Several preferred examples have been described above with reference to the accompanying drawings. Various other examples of the application are also possible and practical. The system may be exemplified in many different forms and should not be construed as being limited to the examples set forth above.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the examples to those skilled in the art. Those parts and elements not shown may be conventional and known in the art.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

The invention claimed is:

1. A method, comprising:
   storing, by a computing device, at least some data from a storage media in a tiering media;
   monitoring, by the computing device, memory access requests from clients to the storage media;
   supplying, by the computing device, the data in the tiering media corresponding to the memory access requests to the clients;
   monitoring, by the computing device, control operations exchanged between the clients and the storage media;
   identifying, by the computing device, a device inquiry in the control operations; and
   selectively invalidating, by the computing device, at least some of the data in the tiering media responsive to identifying the device inquiry.

2. The method of claim 1, further comprising:
   identifying a media device in the storage media identified in the device inquiry; and
   invalidating only the data in the tiering media mapping to the media device in the storage media.

3. The method of claim 1, further comprising:
   referencing configuration information; and
   invalidating the data in the tiring media according to the configuration information.

4. The method of claim 3, wherein the configuration information programmably enables invalidation of data in the tiering media when the device inquiry is detected.

5. The method of claim 1, further comprising:
   monitoring Small Computer System Interface (SCSI) communications between the clients and the storage media to identify a SCSI device inquiry; and
   selectively invalidating at least some of the data in the tiering media when the SCSI device inquiry is detected.

6. The method of claim 1, further comprising:
   monitoring for a bus rescan message in the control operations; and
   invalidating all of the data in the tiering media when the bus rescan message is identified.

7. The method of claim 6, further comprising:
   monitoring Small Computer System Interface (SCSI) communications between the clients and the storage media; and
   invalidating all of the data in the tiering media when a SCSI bus rescan message is detected in the SCSI communications.

8. The method of claim 1, wherein the device inquiry is associated with a prior snapshot operation.

9. An apparatus, comprising:
   tiering media coupled between clients and storage media;
   a configuration device configured with a parameter; and
   a processor coupled between the clients and the storage media, the processor configured to monitor memory access operations by the clients, store at least some data associated with the memory access operations in both the storage media and the tiering media, and provide the data from the tiering media to the clients according to the memory access operations;
   the processor further configured to monitor Small Computer System Interface (SCSI) communications between the clients and the storage media and invalidate at least some of the data in the tiering media when a particular SCSI message in the SCSI communications is detected and the parameter in the configuration device associates the SCSI message with an invalidation condition for the tiering media.

10. The apparatus according to claim 9 wherein the processor is further configured not to invalidate data in the tiering media when the parameter in the configuration device does not associate the SCSI message with an invalidation condition.

11. The apparatus according to claim 9 wherein the SCSI message is a device inquiry.

12. The apparatus according to claim 9 wherein the configuration device is a buffer or memory in a proxy device.

13. The apparatus according to claim 12 wherein the processor is further configured to identify a disk device in the storage media referenced in the SCSI communications and only invalidate data in the tiering media that maps to the disk device.

14. The apparatus according to claim 11 wherein the processor is further configured to invalidate all of the data in the tiering media whenever a SCSI bus rescan is detected in the SCSI communications regardless of what parameter is configured in the configuration device.

15. The apparatus according to claim 9 further comprising a storage controller configured to operate independently from the processor and perform snapshot operations of the data in the storage media and wherein the snapshot operations are hidden from the processor, and wherein the processor is configured to invalidate data in the tiering media responsive to the snapshot operations by monitoring the SCSI communications between the clients and the storage media.

16. The apparatus according to claim 9 wherein the processor and the tiering media are both part of storage access system that operates as a proxy for the memory access operations from the clients to the storage media.

17. A storage access system, comprising:
a proxy device configured to monitor memory access requests from clients to a disk array and selectively copy data into a tiering media for servicing some of the memory access requests, wherein the proxy device is further configured to monitor control operations between the clients and the disk array and selectively invalidate at least some data in the tiering media when the control operations indicate snapshot operations were performed.

18. The storage access system according to claim 17 wherein the proxy device is configured to invalidate at least some of the data in the tiering media responsive to a Small Computer System Interface (SCSI) message identified in the control operations.

19. The storage access system according to claim 18 further comprising a programmable configuration device configured to enable the proxy device to invalidate some of the data in the tiering media when a first SCSI device inquiry message is identified in the control operations.

20. The storage access system according to claim 19 wherein the proxy device is configured to:
invalidate all data in the tiering media when a SCSI bus rescan is identified in the control operations; and
invalidate only a portion of the data in the tiering media when the SCSI device inquiry is identified in the control operations, wherein the portion of the data invalidated maps to a disk device in the disk array identified in the SCSI device inquiry.

* * * * *